(12) United States Patent
Dolph et al.

(10) Patent No.: US 9,069,955 B2
(45) Date of Patent: Jun. 30, 2015

(54) FILE SYSTEM LEVEL DATA PROTECTION DURING POTENTIAL SECURITY BREACH

(71) Applicant: International Business Machines Corporation, Armonk, NY (US)

(72) Inventors: Blaine H. Dolph, Western Springs, IL (US); Sandeep R. Patil, Pune (IN); Riyazahamad M. Shiraguppi, Maharashtra (IN); Gandhi Sivakumar, Victoria (AU); Matthew B. Trevathan, Roswell, GA (US)

(73) Assignee: International Business Machines Corporation, Armonk, NY (US)

( * ) Notice: Subject to any disclaimer, the term of this patent is extended or adjusted under 35 U.S.C. 154(b) by 74 days.

(21) Appl. No.: 13/873,625

(22) Filed: Apr. 30, 2013

(65) Prior Publication Data

US 2014/0325616 A1  Oct. 30, 2014

(51) Int. Cl.
*G06F 21/55* (2013.01)
*G06F 21/62* (2013.01)

(52) U.S. Cl.
CPC ............ *G06F 21/55* (2013.01); *G06F 21/6218* (2013.01)

(58) Field of Classification Search
CPC ....................................................... G06F 21/55
USPC .......................................................... 726/23
See application file for complete search history.

(56) References Cited

U.S. PATENT DOCUMENTS

| | | | |
|---|---|---|---|
| 5,638,509 A | 6/1997 | Dunphy et al. | |
| 5,649,152 A * | 7/1997 | Ohran et al. | 711/114 |
| 6,161,219 A * | 12/2000 | Ramkumar et al. | 717/130 |
| 6,175,924 B1 | 1/2001 | Arnold | |
| 6,647,400 B1 | 11/2003 | Moran | |
| 7,437,764 B1 * | 10/2008 | Sobel et al. | 726/25 |
| 7,587,759 B1 * | 9/2009 | McArdle et al. | 726/22 |
| 7,594,266 B2 | 9/2009 | Mattsson et al. | |
| 7,895,649 B1 * | 2/2011 | Brook et al. | 726/22 |
| 7,908,652 B1 * | 3/2011 | Austin et al. | 726/22 |
| 8,108,935 B1 * | 1/2012 | Sobel et al. | 726/26 |
| 2002/0078397 A1 * | 6/2002 | Qin | 714/13 |
| 2002/0112171 A1 * | 8/2002 | Ginter et al. | 713/185 |
| 2002/0174349 A1 * | 11/2002 | Wolff et al. | 713/188 |
| 2003/0051026 A1 * | 3/2003 | Carter et al. | 709/224 |
| 2003/0056121 A1 * | 3/2003 | Kimoto et al. | 713/202 |
| 2003/0217283 A1 * | 11/2003 | Hrastar et al. | 713/200 |

(Continued)

OTHER PUBLICATIONS

Xin Shao et al, Towards Protecting Sensitivie Files in a Compromised System, University of Michigan, 2006, pp. 1-18.

(Continued)

*Primary Examiner* — Gilberto Barron, Jr.
*Assistant Examiner* — Alexander Lapian
(74) *Attorney, Agent, or Firm* — Patrick J. Daugherty; Driggs, Hogg, Daugherty & Del Zoppo Co., L.P.A.

(57) ABSTRACT

Immediately upon identifying a potential breach to a file system, a read-only snapshot of one or more file sets of data stored on a storage volume of the file system is created, and one or more file system protection commands are invoked that restrict access to the snapshot of the file set. Generating the snapshot and restricting access to the snapshot data may include immediately opening an administrative shell for the file-system in response to identifying a potential breach, and executing administrative shell commands that invoke creation of snapshot and limit access of the snapshot data to an administrator or super user.

19 Claims, 2 Drawing Sheets

(56) References Cited

U.S. PATENT DOCUMENTS

| | | |
|---|---|---|
| 2005/0005070 A1 | 1/2005 | Lam |
| 2005/0172092 A1 | 8/2005 | Lam et al. |
| 2005/0193428 A1 | 9/2005 | Ring et al. |
| 2006/0112151 A1* | 5/2006 | Manley et al. ............... 707/201 |
| 2008/0022133 A1 | 1/2008 | Sobel et al. |
| 2008/0189785 A1 | 8/2008 | Abali et al. |
| 2008/0201763 A1* | 8/2008 | Lynn et al. ........................ 726/1 |
| 2008/0320595 A1* | 12/2008 | van der Made ................ 726/24 |
| 2010/0103901 A1* | 4/2010 | Miki et al. ..................... 370/330 |
| 2011/0167221 A1* | 7/2011 | Pangal et al. ................. 711/117 |
| 2011/0214165 A1* | 9/2011 | Jeffreys et al. ................... 726/5 |
| 2011/0225405 A1* | 9/2011 | Lyons et al. ..................... 713/2 |
| 2012/0036552 A1* | 2/2012 | Dare et al. ........................ 726/1 |
| 2012/0054244 A1* | 3/2012 | Wu et al. ....................... 707/784 |
| 2012/0060006 A1* | 3/2012 | Paterson-Jones et al. .... 711/162 |
| 2012/0084523 A1* | 4/2012 | Littlefield et al. ............ 711/162 |

OTHER PUBLICATIONS

Shvetank Jain et al, Application-Level Isolation and Recovery with Solitude, EuroSys'08, Glasgow, Scotland, UK, 2008, 13 pp.

Axel Buecker et al, Stopping Internet Threats Before They Affect Your Business by Using the IBM Security Network Intrusion Prevention System, IBM Redbooks, Jan. 21, 2011, 42 pp.

Anonymous, Controlled Storage Management for critical data in the enterprise cloud environment, IP.com Prior Art Database Technical Disclosure, IPCOM000220158D, Jul. 24, 2012, 5 pp.

ISA/CN International Search Report and the Written Opinion of the International Searching Authority, dated Jul. 28, 2014, re PCT/CN2014/076422.

\* cited by examiner

FILE SYSTEM LEVEL DATA PROTECTION DURING POTENTIAL SECURITY BREACH

FIELD OF THE INVENTION

The present invention relates to the implementation of intrusion detection and prevention systems to protect the integrity of computer system data from threats.

BACKGROUND

A file system defines a methodology for naming files and placing them into storage devices for retrieval. File system functionality can be described with respect to two components, a user component and a storage component. The user component is responsible for managing files within directories, file path traversals and user access to a file. The storage component of the file system determines how a file is stored physically on the storage device.

An Intrusion Detection System (IDS) is a device or software application that monitors network and/or system activities for malicious activities or policy violations and produces reports to a management Station. Some systems may attempt to stop an intrusion attempt, but this is generally not required or expected of a monitoring system.

An Intrusion Prevention System (IPS) is usually considered an extension of intrusion detection systems. While both monitor network traffic and/or system activities for malicious activity, unlike intrusion detection systems, intrusion prevention systems are placed in-line and are able to actively prevent or block intrusions that are detected.

Intrusion Detection and Prevention Systems (IDPS) include anti-virus systems that typically record information related to observed events, notify security administrators of important observed events, and produce reports. Antivirus software is used to prevent, detect, and remove malware, including, but not limited to, computer viruses, computer worms, Trojan horses, spyware and adware. Computer security, including protection from social engineering techniques, is commonly offered in products and services of antivirus software companies. Antivirus techniques are based on signature-based detection, heuristic-based detection and file emulation.

An IDPS may respond to a detected threat by attempting to prevent it from succeeding. It may use several response techniques which involve stopping the attack itself, changing the security environment (e.g., reconfiguring a firewall), or changing the attack's content. An IDPS may take some action to avoid or restrict external access of computer systems upon suspicion or detection of a system or device intrusion or breach, for example blocking network ports, restricting system policies, etc. It may also alert an administrator ("admin") as to a suspected intrusion or breach, wherein the admin is expected to take application-specific action in response, for example, to restrict file system level policies, etc.

BRIEF SUMMARY

In one aspect of the present invention, a method creates a data snapshot and executes file system protection-specific commands to protect data and limit access of the snapshotted data upon suspicion of a potential security breach. Immediately upon identifying a potential breach to a file system, a read-only snapshot of one or more file sets of data stored on a storage volume of the file system is generated, and one or more file system protection commands are invoked that restrict access to the snapshot of the file set.

In another aspect, a system has a processing unit, computer readable memory and a tangible computer-readable storage medium with program instructions that include one or more file system protection commands. The processing unit, when executing the stored program instructions, immediately upon identifying a potential breach to a file system, generates a read-only snapshot of one or more file sets of data stored on a storage volume of the file system, and restricts access to the snapshot of the file set.

In another aspect, a computer program product has a tangible computer-readable storage medium with computer readable program code embodied therewith, the computer readable program code comprising instructions with program instructions that include one or more file system protection commands. When executed by a computer processing unit, the program instructions cause the computer processing unit to, immediately upon identifying a potential breach to a file system, generate a read-only snapshot of one or more file sets of data stored on a storage volume of the file system, and restrict access to the snapshot of the file set.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical aspects, examples and embodiments of the invention, and therefore should not be considered as limiting the scope of the invention. In the drawings, like numbering represents like elements.

DETAILED DESCRIPTION

Figure 1:
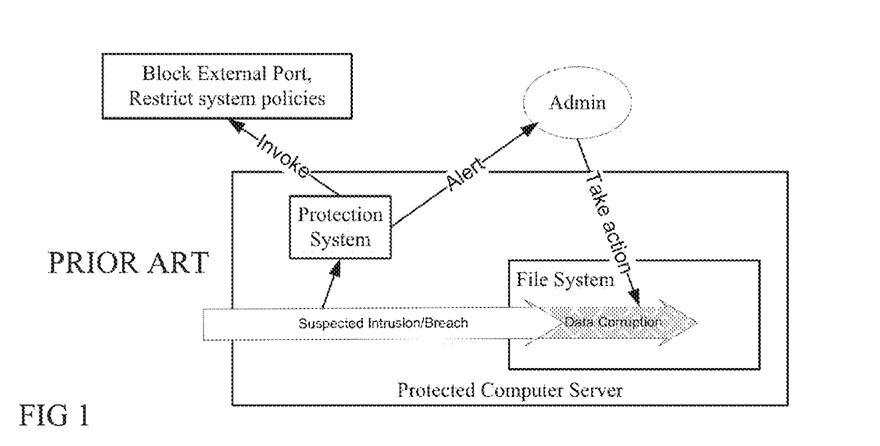
FIG. 1 is a block diagram illustration of an implementation of a prior art Intrusion Detection and Prevention System.

FIG. 1 illustrates a conventional or prior art IDPS implementation that detects illegal requests or buffer overflow attacks and deploys intrusion detection methods inside a file system. The IDPS ("Protection System") in FIG. 1 may respond to a suspected intrusion or breach by attempting to prevent it from succeeding via response techniques which involve stopping the attack itself, such as changing the security environment (e.g., reconfiguring a firewall), or changing the attack's content. It may also directly invoke some general network-level or system-level access restrictions, which may include blocking network ports, restricting system policies, etc. However, the system primarily relies upon alerting an administrator ("admin"), wherein the admin is expected to quickly respond and take application-specific action, for example, may manually restrict file system level policies, etc.

In the time it takes the admin to respond to the alert and take protective actions in the prior art approach of FIG. 1, an intrusion entity might already have entered into the file system and started to corrupt or otherwise change file system data in an undesirable manner. Although the prior art admin might try to correct undesirable changes or recover corrupted data, it may not be possible to revert all data states back to original or other prior, good conditions. In some environments, the admin may not be able to stop a running application to take preventative measures and prevent the intrusion entity from changing file system data associated with the running application in an undesirable manner. There may also be a time delay associated with enabling the admin to detect a malfunctioning application and take preventative action. During this delay, the running application might have corrupted a large portion of data, one large enough to render recovery of the data by the admin difficult or impossible.

Such approaches do not teach how to protect file systems from data changes or corruption immediately upon detecting a suspected or actual intrusion or breach. The prior art does not teach how to control undesirable modifications from the malfunctioning application due to intrusion at the point of suspected intrusion.

Figure 2:
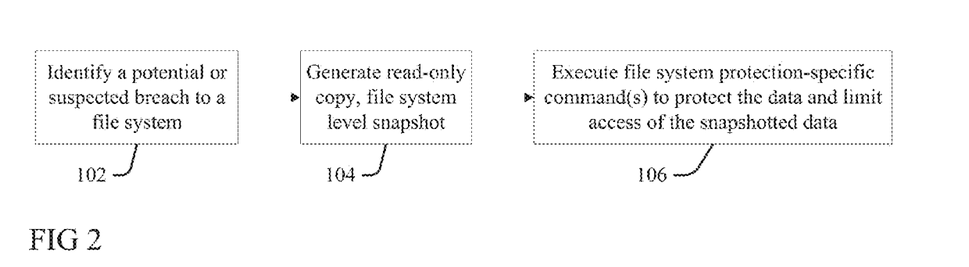
FIG. 2 is a flow chart illustration of a method, system or process for generating a data snapshot and protecting the data snapshot upon a potential, suspected breach of a file system, according to the present invention.

FIG. 2 illustrates one aspect of the present invention for generating a data snapshot and protecting the data snapshot upon a potential, suspected breach of a file system. At 102 a potential or suspected breach to a file system is identified, and immediately in response a read-only, file system level snapshot copy of the file set of data that is stored on a storage volume of the file system is generated at 104, and at 106 one or more file system protection-specific commands are executed to protect the data and limit access of the snapshotted data. In some aspects of the present invention, an administrative shell ("admin shell") for the file-system ("fs") is opened in response to identifying the potential or suspected breach to a file system at 102, a command is executed to invoke the creation of the snapshot of the file system (for example, "Admin-fs>crsnapshot fs1") at 104, and other file system protection-specific commands are executed at 106 to protect the data and limit access of the snapshotted data to the administrator or other "super users" that have higher levels of security access than typical users (for example, "Admin-fs>setfs fs1 mode=protected"; "Admin-fs>setfs fs1 access=SuperUsersOnly").

A file system snapshot refers to methodology for providing an ability to record the state of a storage volume or device of the file system at any given moment and preserve that state as a "snapshot" which may be used as a guide for restoring the storage volume, device or file system, for example in the event that the storage device or file system fails. A snapshot generally creates a point-in-time copy of the storage volume, device or file system data.

A storage snapshot is a set of reference markers, or pointers, to data stored on a disk drive, on a tape, or in a storage area network (SAN). A snapshot is something like a detailed table of contents, but it is treated by the computer as a complete data backup. Snapshots streamline access to stored data and can speed up the process of data recovery. Snapshots preserve the state of a digital storage volume resource.

Figure 3:
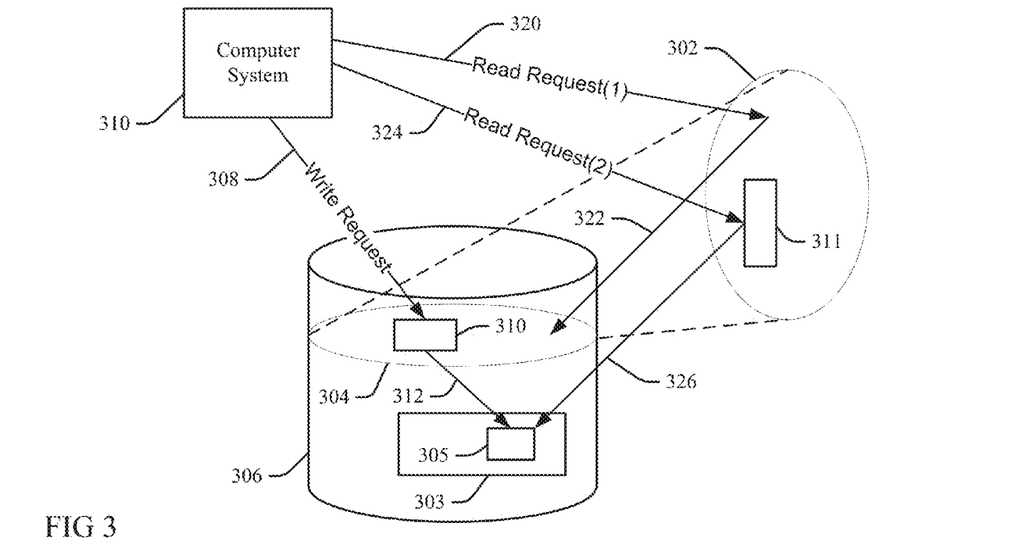
FIG. 3 is a block diagram illustration of a copy-on-write snapshot implementation according to an aspect of the present invention.

There are two main types of storage snapshots, a "copy-on-write" (or low-capacity) snapshot, and a split-mirror snapshot. FIG. 3 illustrates one aspect of a copy-on-write snapshot 302 according to the present invention. The snapshot 302 is created as a copy of an original state of data 304 stored in a storage volume 306, using a pre-designated space 303 for the snapshot 302 within the storage volume 306, after the original copy 304 is frozen for a short time necessary to create the snapshot logical copy 302. When the copy-on-write snapshot 302 is first created, only meta-data about where original data 304 is stored is copied, and no physical copy of the original data 304 is performed at the time the snapshot is created, enabling an almost instantaneous creation of the snapshot 302.

The snapshot copy 302 tracks changing data on the original volume copy 304 as writes to the original volume 304 are performed in response to write requests. Before a write is allowed to a portion (block or blocks) 310 of the original data copy 304 in response to a write request 308 by a computer system 310, the original data 310 that is being written to is moved (copied) at 312 into a portion (block or blocks) 305 of the designated storage pool 303 that is set aside for the snapshot 302, thus before this original data 304 is overwritten by the write request 308. Accordingly, this process is conventionally referred to as a "copy-on-write" process.

Read requests to the snapshot volume 302 of the any of the unchanged data blocks of the original data 304, such as "Read Request (1)" 320 from the computer system 310, are redirected (per 322) from the snapshot 302 to data on the original volume 304. In contrast, read requests to any of the data blocks 311 in the snapshot 302 that were changed in the original data volume in response to the Write Request 308 (blocks 310 of 304), such as "Read Request (2)" 324 from the computer system 310, are directed (via 326) to the "copied" blocks 305 in the space 303 allocated to the snapshot 302. This enables the snapshot data 302 to stay consistent with the state of the original data 304 at the time that the snapshot 302 was taken.

The copy-on-write snapshot contains the meta-data that describes the data blocks that have changed since the snapshot was first created. Note that original data blocks are copied only once into the snapshot storage when the first write request is received. Copy-on-write file system snapshot copies may be done rapidly, instantly, and made available for use by other applications such as data protection, data analysis and reporting, and data replication applications. The original data may continue to be available to applications without interruption, while the snapshot copy is used to perform other functions on the data.

In the prior art, a copy-on-write snapshot utility may create a snapshot of changes to stored data every time new data is entered or existing data is updated. This allows rapid recovery of data in case of a disk write error, corrupted file, or program malfunction. However, all previous snapshots must be available if complete archiving or recovery of all the data on a network or storage medium is needed. Further, as the prior art does not create a snapshot upon suspicion of intrusion, the data may be corrupted between the time of the last data write and a next data write due to an intervening intrusion that is not associated with a write operation: this exposure is prevented by aspects of the present invention.

A "redirect-on-write" snapshot is similar to a copy-on-write snapshot, but without a double write penalty. It offers storage space and performance efficient snapshots, wherein new writes to an original volume are redirected to another location set aside for snapshot. The advantage of redirecting the write is that only one write takes place, whereas with copy-on-write, two writes occur (one to copy original data 310 onto the storage space 305, the other to copy changed data at 310). However, with redirect-on-write, the original copy contains the point-in-time data, that is, snapshot, and the changed data resides on the snapshot storage. When a snapshot is deleted, the data from the snapshot storage must be reconciled back into the original volume. Furthermore, as multiple snapshots are created, access to the original data, tracking of the data in snapshots and original volume, and reconciliation upon snapshot deletion may be further complicated. The "redirect-on-write" snapshot relies on the original copy of the data, and the original data set can quickly become fragmented.

A split-mirror snapshot references all the data on a set of mirrored drives. Split mirror creates a physical clone of the storage entity, such as the file-system, volume, or Logical Unit Number (LUN) for which snapshot is being created, onto another entity of the same kind and the exact same size. The entire contents of the original volume are copied onto a separate volume every time a split-mirror snapshot utility is run, not only the new or updated data. The split-mirror approach makes it possible to access data offline, as clone copies are exact duplicates of the original volume that reside on a separate storage space, and simplifies the process of recovering, duplicating, or archiving all the data on a drive.

However, due to the larger amounts of data that must be copied to generate a split-mirror snapshot, such approaches are slower than copy-on-write processes and split-mirror snapshots cannot generally be created instantaneously. Suspected breaches may occur frequently, and result in many false alarms. This indicates against the use of split-mirror or other mechanisms with large overheads. Accordingly, as copy-on-write mechanisms have less overhead while taking each snapshot, and require less storage space for each snapshot, they are much more useful in implementations of the present invention that may experience frequent or multiple determinations of suspected security breaches.

Another snapshot variation is a "log structure file architecture" method that uses log files to track data writes back to an original volume. When data need to be restored or rolled back, transactions from the log files may be run in reverse, with each write request to the original volume logged much like a relational database. Snapshot methods may also be combined with other data backup mechanisms. In one example, a full copy of the snapshot data is created using copy-on-write and a background process copies data from original location to snapshot storage space, combining the benefits of copy-on-write and split mirror methods. "Continuous data protection" (CDP) processes, also called continuous backup, refers to backups of data when a change is made to that data by automatically capturing the changes to a separate storage location. CDP effectively creates an electronic journal of complete storage snapshots. CDP differs from copy-on-write and other snapshot methods by creating one snapshot for every instant in time that data modification occurs, in contrast to one point-in-time copy of the data created by copy-on-write methods. Still other snapshot mechanisms and variations may be practiced in implementations of the present invention, based upon resource availabilities and capabilities, as will be apparent to one skilled in the art.

A storage volume 306 may be defined as a storage stack that includes many hardware and software components or layers that render physical storage media to the applications that run on a host operating system. Snapshot solutions can be implemented in software-based layers or in hardware-based layers, and may be categorized as controller-based (storage device or hardware driven) snapshots or host-based (file-system or volume managers) snapshots. Controller-based snapshots generally managed by storage subsystem hardware vendors and integrated into disk arrays, are performed at LUN level (block level) and are independent of the operating system and file systems. Host-based snapshots are implemented between the device driver and file-system levels, and may have no dependency on underlying storage hardware but instead depend on file-system and volume manager software, and operate on a logical view of the data (in contrast to the physical layout of the data which is used by the controller-based snapshot).

Figure 4:
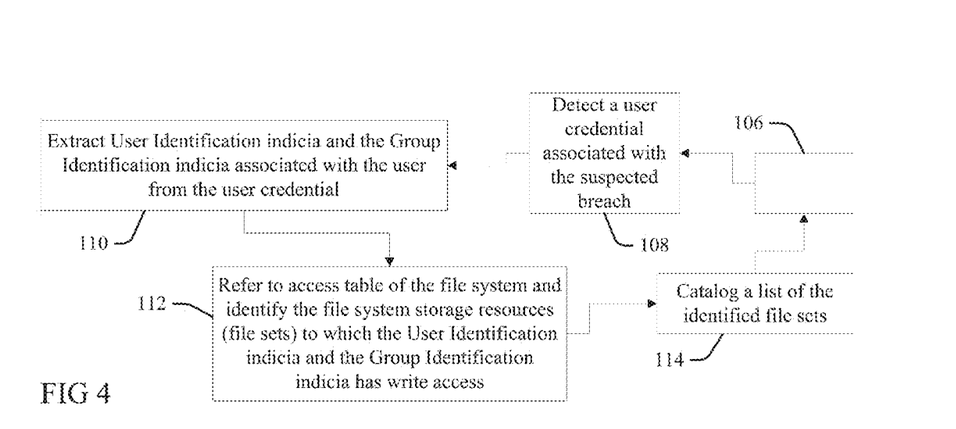
FIG. 4 is a flow chart illustration of a method, system or process for generating a data snapshot and protecting the data snapshot upon a potential, suspected breach of a file system, according to the present invention.

FIG. 4 illustrates another aspect of the present invention, wherein executing the file system protection-specific command(s) (at 106, FIG. 2) further includes detecting a user credential associated with the suspected breach at 108, and extracting a User Identification indicia (UID, or user ID) and a Group Identification indicia (GID, or group ID) associated with the user from the user credential at 110. In one example, this is accomplished by interacting with an authentication server and obtaining the information. More particularly, in a Unix® file system, the GID is a name that associates a system user with other users sharing a common attribute, such as assignment to a specific work project or organization (department) name, wherein a UID may be a member of more than one group and thus have more than one GID. Any user using a Unix® system at a given time has both a user ID and a group ID. (UNIX is a registered trademark of The Open Group in the United States and other countries.)

Accordingly, at 112 some aspects of the invention refer to an access table of the file system and identify the file system storage resources (file sets) to which the user (UID and GID) has write access (and which includes the snapshotted data file sets), catalog a list of the identified file sets at 114, and invoke file system protection commands at 106 to restrict access to the cataloged, identified file sets by any user with the UID and GID.

Figure 5:
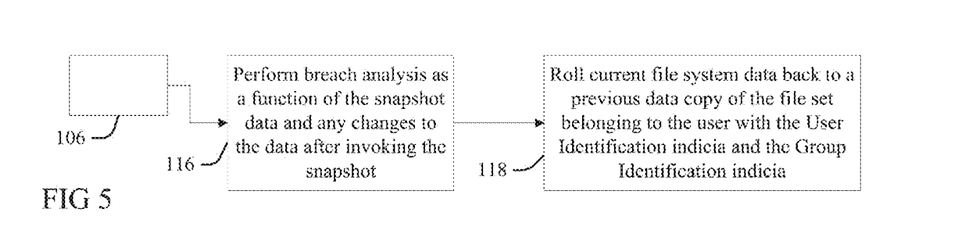
FIG. 5 is a flow chart illustration of a method, system or process for generating a data snapshot and protecting the data snapshot upon a potential, suspected breach of a file system, according to the present invention.

FIG. 5 illustrates another aspect of the present invention, wherein after executing the file system protection-specific command(s) (at 106, FIG. 2), at 116 an admin, super user or other auditor entity provided with access to the data performs breach analysis as a function of the snapshot data and any changes to the data after invoking the snapshot. More particularly, the admin, etc., may compare the snapshot data that is previous in time to the potential identified breach (at 102, FIG. 2) with data after (post) the identified potential breach to determined differences in the data which may help in analysis of the breach to determine its intent or cause. The snapshot may also be used to roll the current file system data back at 118 to a previous data copy of the file set belonging to the user ID and GID associated with the breach, thus negating the impact of the breach associated with or caused by the user.

In contrast, solutions in the prior art generally include the admin switching back to an older snapshot copy to restore good data. However, this approach results in a loss of all data changes entered before the intrusion and after the last snapshot, which may include the loss of desired or good changes done by running applications during this time period. For example, U.S. Pat. No. 7,594,266 ("Data security and intrusion detection," application Ser. No. 11/540,467) teaches a file system wherein item requests are examined to determine if the request and/or a result violates an item access rule. If either the request or the result violates the item access rule, an access control manager is alerted and appropriate action is taken, such as not complying with the item request. This art does not discuss about how to prevent file system corruption in the case when an intrusion entity enters into the system as an authenticated user and starts corruption or affects some application for malfunctioning. It also does not teach controlling impacts from data corruption.

In another prior art example taught by U.S. Pat. No. 6,647,400 ("System and method for analyzing filesystems to detect intrusions," application Ser. No. 09/651,304), various mechanisms control intrusion detection in a file system by preventing intrusion by using various control processes. This reference does not teach how to control impact of corruption, or address cases when intrusion entities enter into a system as an authenticated user and start corruption, or teach how to prevent a running application from malfunctioning wherein corrupted writes may look to IPS's as normal writes.

In contrast, aspects of the present invention provide file system protection mechanisms wherein on suspicion of an intrusion or breach an IDPS system immediately triggers the invoking of snapshot (read-only data) mechanisms to minimize impact of intrusion in the file system. File system snapshot is a point-in-time copy of the data which allows for data protection, application availability, faster recovery, and reduces exposure to data loss. Taking a snapshot at the time of a suspected intrusion or breach will protect data until that point by making it as read-only copy that an intrusion entity will not be able to affect in anyway. This helps to minimize the impact of undesirable data changes or corruption to data systems in cases of potential or suspected intrusions or breaches.

In some aspects of the present invention, the created snapshots are replicated to another site, such as a peer data center site. Utilizing backup and replication transfer via an external peer data-center site, the creation of the snapshot on a suspected intrusion or breach ensures that a copy of good data until a given point in time is safely replicated to another site out of reach of the harmful effects of the suspected breach. Thus, in the case of major problems that may be caused by corruption or crash due to the intrusion/breach, the peer site will have a latest, updated copy of good data prior to the breach/intrusion.

Invoking file system-specific security commands to restrict access to the file system provides additional data protection attributes. In some aspects, restricting access to the file system data to only those users with administrative levels of permission (an admin user) or other high level of permission (a super user) includes preventing any other users with lower permission levels from executing write or other data revision commands with respect to the restricted-access file sets.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. Examples of a computer readable storage medium exclude transitory, propagation or carrier wave signals or subject matter and include an electronic, magnetic, optical or semiconductor system, apparatus, or device, or any suitable combination of the foregoing. More specific examples (a non-exhaustive list) of the computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium is not a transitory, propagation or carrier wave signal, but instead may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
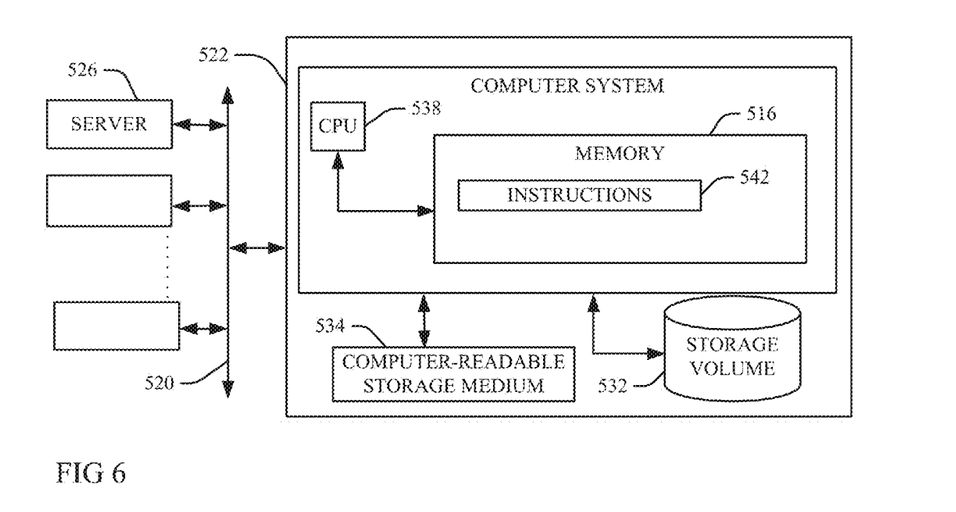
FIG. 6 is a block diagram illustration of a computer system implementation of an aspect of the present invention.

Referring now to FIG. 6, an exemplary computerized implementation of an aspect of the present invention includes a computer system or other programmable device 522 in communication with various servers, clients and other external devices 526 through a network infrastructure 520 that creates a snapshot of data stored on a storage volume 532 and executes file system protection-specific command(s) to protect the data and limit access of the snapshotted data immediately upon suspicion of a potential security breach, for example as described above with respect to FIGS. 2 through 5. Instructions 542 reside within computer readable code in a computer readable memory 516, or in the computer readable storage volume 532 or other tangible computer readable storage medium 534 that is accessed through the computer network infrastructure 520 by a Central Processing Unit (CPU) 538. Thus, the instructions, when implemented by the processing unit 538, cause the processing unit 538 to automatically implement a file system protection command and create a data snapshot upon suspicion of a potential security breach.

In one aspect, the present invention may also perform process steps of the invention on a subscription, advertising, and/or fee basis. That is, a service provider could offer to integrate computer-readable program code into the computer system 522 to enable the computer system 522 to automatically implement a file system protection command and create a data snapshot upon suspicion of a potential security breach as described above. The service provider can create, maintain, and support, etc., a computer infrastructure, such as the computer system 522, network environment 520, or parts thereof, that perform the process steps of the invention for one or more customers. In return, the service provider can receive payment from the customer(s) under a subscription and/or fee agreement and/or the service provider can receive payment from the sale of advertising content to one or more third parties. Services may include one or more of: (1) installing program code on a computing device, such as the computer device 522, from a tangible computer-readable medium device 532 or 534; (2) adding one or more computing devices to a computer infrastructure; and (3) incorporating and/or modifying one or more existing systems of the computer infrastructure to enable the computer infrastructure to perform the process steps of the invention.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The aspect was chosen and described in order to best explain the principles of the invention and the practical application, and to enable others of ordinary skill in the art to understand the invention for various embodiments with various modifications as are suited to the particular use contemplated.

The flowchart and block diagrams in the figures illustrate the architecture, functionality, and operation of possible implementations of systems, methods and computer program products according to various aspects of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for creating a data snapshot and executing file system protection-specific commands to protect data and limit access of the snapshotted data upon suspicion of a potential security breach, the method comprising:
   in response to identifying a suspected breach to a file system, at a time of the identifying the suspected breach:
   generating a read-only snapshot of at least one file set of data that is stored on a storage volume of the file system;
   invoking at least one file system protection command that restricts access to the snapshot of the at least one file set of data;
   detecting a user credential associated with the suspected breach;
   extracting from an authentication server a user identification indicia and a group identification indicia for the user that is associated with the suspected breach;
   referring to an access table of the file system to identify a first plurality of file sets stored within system storage resources to which the user identification indicia and the group identification indicia have write access and which comprises the at least one file set of the generated read-only snapshot; and
   invoking a file system protection that restricts access, by any user with the user identification indicia and the group identification indicia, to the identified first plurality of file sets stored within the system storage resources.

2. The method of claim 1, wherein the step of generating the read-only snapshot of the at least one file set of data that is stored on the storage volume of the file system further comprises:
opening an administrative shell for the file-system at the time of the identifying the suspected breach, in response to the identifying the suspected breach to the file system; and
executing an administrative shell snapshot command that invokes the creation of the generated snapshot of the file system; and
wherein the step of invoking the at least one file system protection command that restricts access to the snapshot of the at least one file set of data further comprises executing an administrative shell file system protection-specific command that limits access of the data of the snapshot of the at least one file set of data to an administrator, or to a super user that has a higher level of security access than a user of the file system.

3. The method of claim 1, wherein the step of generating, at the time of the identifying the suspected breach, the read-only snapshot of the at least one file set of data that is stored on the storage volume of the file system, comprises:
generating a logical copy-on-write snapshot comprising a set of reference pointers to an original copy of data stored on the storage volume of the file system.

4. The method of claim 1, wherein the step of generating, at the time of the identifying the suspected breach, the read-only snapshot of the at least one file set of data that is stored on the storage volume of the file system, comprises:
generating a logical redirect-on-write snapshot comprising a set of reference pointers to an original copy of data stored on the storage volume of the file system, wherein new writes to an original volume are redirected to another location set aside for the redirect-on-write snapshot.

5. The method of claim 1, further comprising:
integrating computer-readable program code into a computer system comprising a processing unit, a computer readable memory and a computer readable tangible storage medium;
wherein the computer readable program code is embodied on the computer readable tangible storage medium and comprises instructions for execution by the processing unit via the computer readable memory that cause the processing unit to, in response to identifying the suspected breach to the file system, perform the steps of generating at the time of the identifying the suspected breach the read-only snapshot of the at least one file set of data that is stored on the file system storage volume, invoking the at least one file system protection command that restricts access to the snapshot of the at least one file set of data, detecting the user credential associated with the suspected breach, extracting from the authentication server the user identification indicia and the group identification indicia for the user that is associated with the suspected breach, referring to the access table of the file system to identify the first plurality of file sets stored within system storage resources, and invoking the file system protection that restricts access, by any user with the user identification indicia and the group identification indicia, to the identified first plurality of file sets stored within the system storage resources.

6. The method of claim 1, further comprising:
using the snapshot to roll a current state of the file system data back to a previous data copy of the file set that belongs to the user identification indicia and the group identification indicia associated with the suspected breach.

7. The method of claim 6, further comprising:
restoring data within the at least one file set of the snapshot by rewriting sectors that were modified since the snapshot was generated.

8. A system, comprising:
a processing unit;
a computer readable memory in communication with the processing unit; and
a tangible computer-readable storage medium in communication with the processing unit;
wherein the processing unit, in response to identifying a suspected breach to a file system, at a time of the identifying the suspected breach, executes program instructions comprising at least one file system protection command and stored on the tangible computer-readable storage medium via the computer readable memory and thereby:
generates a read-only snapshot of at least one file set of data that is stored on a storage volume of the file system;
restricts access to the snapshot of the at least one file set of data;
detects a user credential associated with the suspected breach;
extracts from an authentication server a user identification indicia and a group identification indicia for the user that is associated with the suspected breach;
refers to an access table of the file system to identify a first plurality of file sets stored within system storage resources to which the user identification indicia and the group identification indicia have write access and which comprises the at least one file set of the generated read-only snapshot; and
invokes a file system protection that restricts access, by any user with the user identification indicia and the group identification indicia, to the identified first plurality of file sets stored within the system storage resources.

9. The system of claim 8, wherein the processing unit executes the program instructions stored on the computer-readable storage device via the computer readable memory and thereby:
generates the read-only snapshot of the at least one file set of data stored on the file system storage volume by:
opening an administrative shell for the file-system at the time of the identifying the suspected breach, in response to the identifying the suspected breach to the file system; and
executing an administrative shell snapshot command that invokes the creation of the generated snapshot of the file system; and
restricts access to the snapshot of the at least one file set of data by executing an administrative shell file system protection-specific command that limits access of the data of the snapshot of the at least one file set of data to an administrator, or to a super user that has a higher level of security access than a user of the file system.

10. The system of claim 8, wherein the processing unit executes the program instructions stored on the computer-readable storage device via the computer readable memory and thereby generates the snapshot as a logical copy-on-write snapshot comprising a set of reference pointers to an original copy of data stored on the storage volume of the file system.

11. The system of claim 8, wherein the processing unit executes the program instructions stored on the computer-readable storage device via the computer readable memory and thereby:
  generates the snapshot as a logical redirect-on-write snapshot comprising a set of reference pointers to an original copy of data stored on the storage volume of the file system; and
  redirects new writes to an original volume to another location set aside for the redirect-on-write snapshot.

12. The system of claim 8, wherein the processing unit executes the program instructions stored on the computer-readable storage device via the computer readable memory, and thereby further:
  uses the snapshot to roll a current state of the file system data back to a previous data copy of the file set that belongs to the user identification indicia and the group identification indicia associated with the suspected breach.

13. The system of claim 8, wherein the processing unit executes the program instructions stored on the computer-readable storage device via the computer readable memory, and thereby further:
  restores data within the file sets by rewriting sectors that were modified since the snapshot was generated.

14. A computer program product for generating a data snapshot and protecting the data snapshot upon a suspected breach of a file system, the computer program product comprising:
  a computer readable tangible storage medium having computer readable program code embodied therewith, the computer readable program code comprising instructions comprising at least one file system protection command for execution by a computer processing unit that causes the computer processing unit to, in response to identifying a suspected breach to a file system, at a time of the identifying the suspected breach:
  generate a read-only snapshot of at least one file set of data that is stored on a storage volume of the file system;
  restrict access to the snapshot of the at least one file set of data;
  detect a user credential associated with the suspected breach;
  extract from an authentication server a user identification indicia and a group identification indicia for the user that is associated with the suspected breach;
  refer to an access table of the file system to identify a first plurality of file sets stored within system storage resources to which the user identification indicia and the group identification indicia have write access and which comprises the at least one file set of the generated read-only snapshot; and
  invoke a file system protection that restricts access, by any user with the user identification indicia and the group identification indicia, to the identified first plurality of file sets stored within the system storage resources.

15. The computer program product of claim 14, wherein the computer readable program code instructions for execution by the computer processing unit further cause the computer processing unit to generate the read-only snapshot of the at least one file set of data stored on the file system storage volume by:
  opening an administrative shell for the file-system at the time of the identifying the suspected breach, in response to the identifying the suspected breach to the file system; and
  executing an administrative shell snapshot command that invokes the creation of the generated snapshot of the file system; and
  restrict access to the snapshot of the at least one file set of data by executing an administrative shell file system protection-specific command that limits access of the data of the snapshot of the at least one file set of data to an administrator, or to a super user that has a higher level of security access than a user of the file system.

16. The computer program product of claim 14, wherein the computer readable program code instructions for execution by the computer processing unit further cause the computer processing unit to generate the snapshot as a logical copy-on-write snapshot comprising a set of reference pointers to an original copy of data stored on the storage volume of the file system.

17. The computer program product of claim 14, wherein the computer readable program code instructions for execution by the computer processing unit further cause the computer processing unit to:
  generate the snapshot as a logical redirect-on-write snapshot comprising a set of reference pointers to an original copy of data stored on the storage volume of the file system; and
  redirect new writes to an original volume to another location set aside for the redirect-on-write snapshot.

18. The computer program product of claim 14, wherein the computer readable program code instructions for execution by the computer processing unit further cause the computer processing unit to:
  use the snapshot to roll a current state of the file system data back to a previous data copy of the file set that belongs to the user identification indicia and the group identification indicia associated with the suspected breach.

19. The computer program product of claim 14, wherein the computer readable program code instructions for execution by the computer processing unit further cause the computer processing unit to:
  restore data within the file sets by rewriting sectors that were modified since the snapshot was generated.

\* \* \* \* \*